(12) United States Patent  
Crockett et al.

(10) Patent No.: US 8,599,140 B2  
(45) Date of Patent: Dec. 3, 2013

(54) PROVIDING A FRUSTRATED TOTAL INTERNAL REFLECTION TOUCH INTERFACE

(75) Inventors: Timothy W. Crockett, Raleigh, NC (US); Robert S. Fortenberry, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2341 days.

(21) Appl. No.: 10/991,668

(22) Filed: Nov. 17, 2004

(65) Prior Publication Data

US 2006/0114237 A1     Jun. 1, 2006

(51) Int. Cl.  
*G06F 3/041*     (2006.01)

(52) U.S. Cl.  
USPC .......................................... 345/173; 345/174

(58) Field of Classification Search  
USPC ................................................. 345/173–175  
See application file for complete search history.

(56) References Cited

U.S. PATENT DOCUMENTS

| | | | |
|---|---|---|---|
| 4,484,179 A | 11/1984 | Kasday | |
| 5,578,817 A | 11/1996 | Bidiville et al. | |
| 6,124,587 A | 9/2000 | Bidiville et al. | |
| 6,972,753 B1 * | 12/2005 | Kimura et al. | 345/175 |
| 7,101,070 B2 * | 9/2006 | Yu et al. | 362/558 |
| 2004/0004601 A1 | 1/2004 | Wu | |

\* cited by examiner

*Primary Examiner* — Duc Dinh  
(74) *Attorney, Agent, or Firm* — Brandon C. Kennedy; Thomas E. Tyson; Bigger & Ohanian, LLP.

(57) ABSTRACT

A method for providing a touch interface on a display is described. The method includes providing an emitter on a first side of the display and providing a detector on a second side of the display. The emitter provides an electromagnetic signal to the display. The electromagnetic signal has a path from the emitter to the detector through the display in the absence of a user's touch such that the electromagnetic signal is detected by the detector in the absence of the user's touch. The path includes at least one total internal reflection in the display. The emitter and the detector are configured such that the user's touch at any of the at least one total internal reflection alters the path such that a portion of the electromagnetic signal does not reach the detector.

21 Claims, 3 Drawing Sheets

PROVIDING A FRUSTRATED TOTAL INTERNAL REFLECTION TOUCH INTERFACE

FIELD OF THE INVENTION

The present invention relates to computer system interfaces and more particularly to a method and system for providing a touch interface using frustrated total internal reflection as a detection mechanism.

BACKGROUND OF THE INVENTION

Touch interfaces are used in a variety of computer systems. FIG. 1A depicts a side view of a portion of a conventional touch interface 10 in the absence of a user's touch. The conventional touch interface 10 includes a screen 20, emitter 30, and detector 40. Although only one emitter 30 and one detector 40 are depicted, the conventional touch interface 10 typically includes emitters on first and second sides of the screen 20 and corresponding detectors on the third and fourth sides of the screen 20 that are opposite to the first and second sides, respectively.

In operation, the emitter 30 emits an electromagnetic signal that is typically an infrared signal. The infrared signal follows the path 50 to the detector 40 in the absence of a user's touch. When a user is not touching the screen 20, the detector 40 detects the infrared signal. Thus, infrared signals between the emitters and detectors form a grid over the screen 50 when a user is not touching the screen 20.

FIG. 1B depicts the conventional touch interface 10 when a user touches the screen 20. When the user touches the screen 20, the path 50 of the infrared signal is changed to the path 50'. Thus, because path 50' does not reach the detector 40, the infrared signal does not reach the detector 40. As a result, the user's touch is detected. A touch that interrupts any of the infrared signals between the emitter and detector pairs will be detected. Thus, the conventional touch interface 10 allows the user to interact with the computer system employing the conventional touch interface 10.

Referring to FIGS. 1A and 1B, although the conventional touch interface 10 functions, one of ordinary skill in the art will readily recognize that the conventional touch interface 10 is subject to detecting false positives for unintentional touches. Unintentional touches occur when items other than a user touch the screen. Unintentional touches can interrupt the path 50 between the emitter 30 and detector 40. For example, items other than the user depicted in FIG. 1B can result in the path 50' that does not reach the detector 40. For example, clothing such as ties, flies, or other items touching the screen 20 result in the path 50'. Consequently, the conventional touch interface 10 detects such unintentional touches, resulting in false positives for the unintentional touches.

Accordingly, what is needed is a mechanism for providing a touch interface that reduces the false positives that are detected. The present invention addresses such a need.

BRIEF SUMMARY OF THE INVENTION

The present invention provides a method and system for providing a touch interface on a display. The method and system comprise providing an emitter on a first side of the display and providing a detector on a second side of the display. The emitter provides an electromagnetic signal to the display. The transparent display cover is of sufficient density and thickness to create the conditions required for total internal reflection. The electromagnetic signal has an internally reflected path from the emitter to the detector through the transparent display cover in the absence of a user's touch such that the electromagnetic signal is detected by the detector in the absence of the user's touch. The emitter and the detector are configured such that the user's touch on the transparent cover frustrates the total internal reflection path reducing the portion of the electromagnetic signal that reaches the detector. A loss of transferred electromagnetic energy from the emitter to the detector below a specified threshold is perceived as a valid touch.

According to the method and system disclosed herein, the present invention provides a touch interface which is sensitive to the user's touch, and results in reduced false positives due to unintentional touches.

DETAILED DESCRIPTION OF THE INVENTION

The present invention relates to touch interfaces. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for providing a touch interface on a display. The method and system comprise providing an emitter on a first side of the display and providing a detector on a second side of the display. The emitter provides an electromagnetic signal to the display. The electromagnetic signal has a path from the emitter to the detector through the transparent cover of the display in the absence of a user's touch such that the electromagnetic signal is detected by the detector in the absence of the user's touch. The path includes total internal reflections in the display. The path does not include any non reflected energy such as energy that does not travel through the transparent cover as well as straight through or zero mode paths. The emitter and the detector are configured such that the user's touch on the transparent cover frustrates the total internal reflection such that it reduces the portion of the electromagnetic signal that reaches the detector below the detection threshold.

The present invention will be described in terms of a particular touch interface using certain emitters and detectors in particular positions. However, one of ordinary skill in the art will readily recognize that the method and system can be utilized for other touch interfaces not inconsistent with the present invention. Furthermore, although the present invention is described in the context of particular computer system, nothing prevents the method and system from being used in conjunction with other computer systems.

Figure 1A:
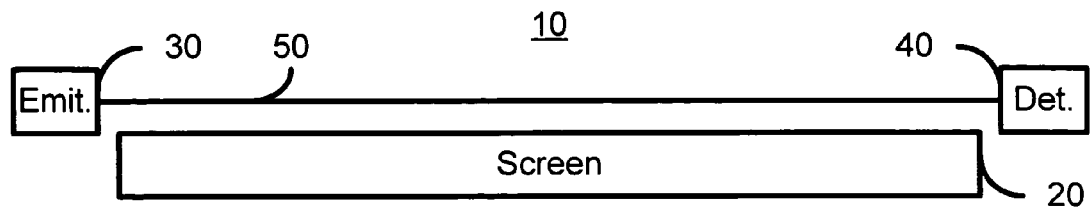
FIG. 1A is a diagram depicting a side view of a portion of a conventional touch interface when a user is not touching the screen.
Figure 1B:
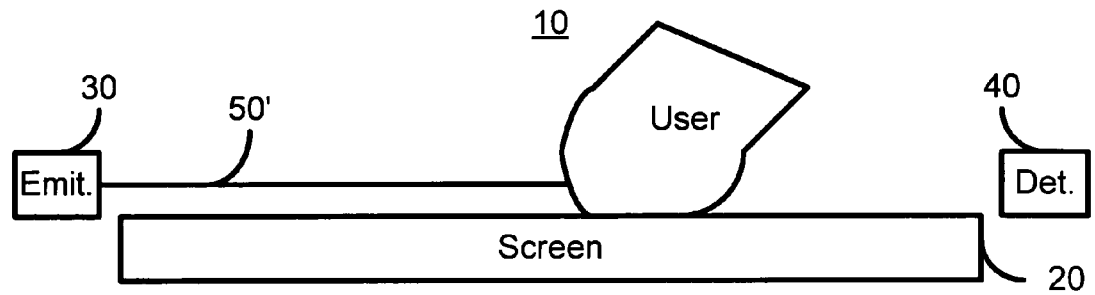
FIG. 1B is a diagram depicting a side view of a portion of a conventional touch interface when a user is touching the screen.
Figure 2:
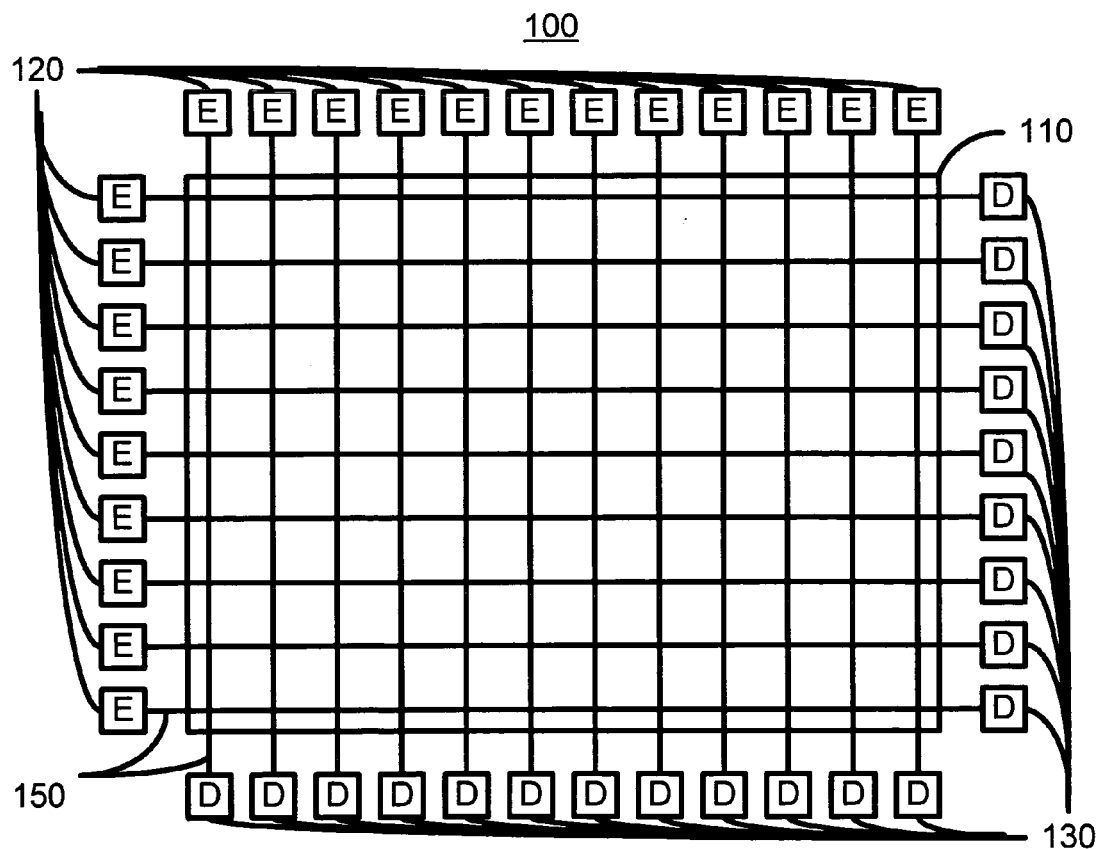
FIG. 2 is a diagram depicting a top view of a portion of one embodiment of a touch interface in accordance with the present invention when a user is not touching the display.

FIG. 2 is a diagram depicting a top view of a portion of a touch interface 100 in accordance with the present invention when a user is not touching the display. The touch interface 100 includes a display 110, emitters 120, and detectors 130. The display 110 is termed a display because the user preferably views images depicted by the system with which the touch interface 100 is used through the display 100. However, note that in one embodiment, described below, the display 110 is placed on top of a screen that is already in place. The electromagnetic signals from the emitters 120 to the detectors 130 have paths 150 forming a grid across the display 110. Note, however, that for clarity only two of the paths 150 are marked in FIG. 2. In a preferred embodiment, the electromagnetic signals are infrared signals. However, in another embodiment, another type of signal might be used. Further, although the paths 150 are depicted as lines in FIG. 2, the paths can be considered to have a finite width.

The emitters 120 and detectors 130 are arranged such that a user's touch on any portion of interest on the display 110 can be detected. Thus, the spaces between the paths 150 should be small enough that a user's finger touching the display 110 always contacts at least part of one of the electromagnetic signals. However, the paths are also sufficiently separated that the user's touch results in a sufficient reduction of signal to be detectable. Also in a preferred embodiment, only one pair of emitters 120-detectors 130 are active at any one time. As a result, components may be placed in very close proximity without resulting in issues due to interference. Stated differently, time domain multiplexing or scanning is preferably employed. In a preferred embodiment, the emitters 120 and detectors 130 are placed such that the paths are one to one and one half centimeters apart. However, in another embodiment, the electromagnetic signals may be separated by a different distance. In addition, although the paths 150 are depicted as forming a rectangular grid between opposing sides of the display 110 is depicted in FIG. 2, nothing prevents another arrangement of the emitters 120 and detectors 130. Further, although a particular number of emitters 120 and detectors 130 are shown for clarity, nothing prevents the use of another number of detectors 130 and/or emitters.

Figure 3A:
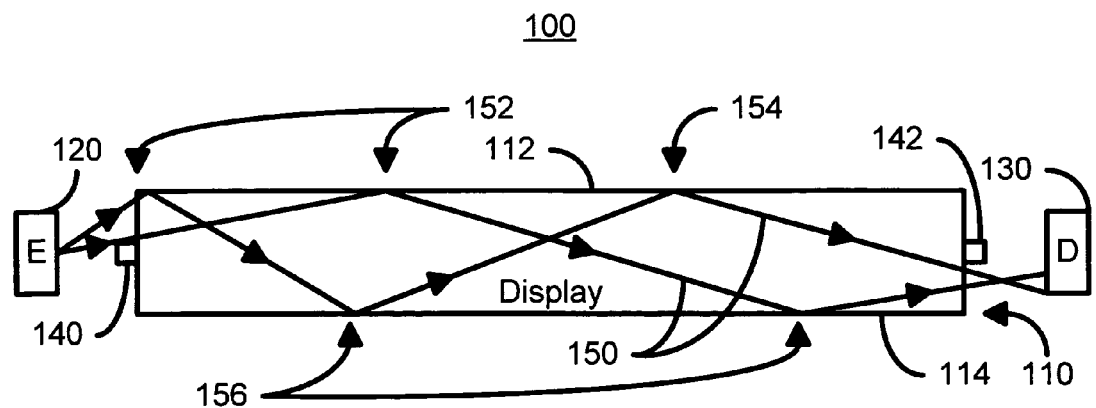
FIG. 3A is a diagram depicting a side view of a portion of one embodiment of a touch interface in accordance with the present invention when a user is not touching the display.
Figure 3B:
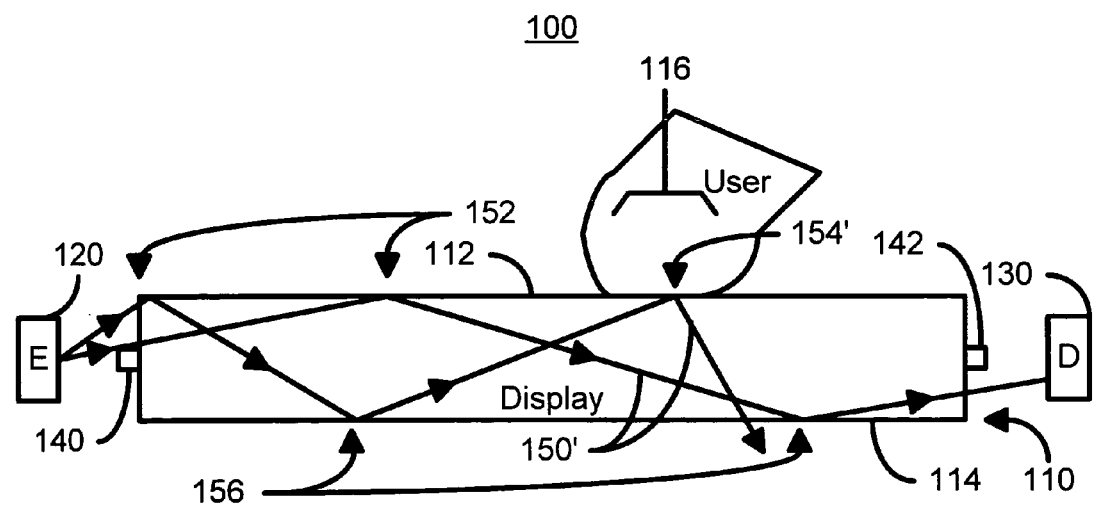
FIG. 3B is a diagram depicting a side view of a portion of a one embodiment of touch interface in accordance with the present invention when a user is touching the display.

FIG. 3A depicts a side view of one embodiment of the touch interface 100 in accordance with the present invention when a user is not touching the display 110. Referring to FIGS. 2 and 3A, an emitter 120 and a corresponding detector 130 are depicted, as well as the path 150 between the emitter 120 and detector 130 for the electromagnetic signal. Also depicted in FIGS. 3A and 3B are barriers 140 and 142. Although not shown in FIG. 2, each emitter 120 and detector 130 preferably has a corresponding barrier 140 and 142, respectively.

As can be seen in FIG. 3A, the electromagnetic signal travels between the emitter 120 and the detector 130. The path 150 traveled by the electromagnetic signal between the emitter 120 and detector 130 includes one or more total internal reflection 152, 154, and 156 at the upper surface 112 and/or lower 114 surfaces of the display 110. For total internal reflection to occur, the index of refraction outside of the display 110 where the total internal reflection 152, 154, or 156 occurs is lower than the index of refraction of the display 110. The angle of reflection depends upon the ratio of the index of refraction of the display 110 and the index of refraction of the region outside of the display 110. In a preferred embodiment, air surrounds the display 110 at its upper and lower surfaces 112 and 114, respectively. However, in another embodiment, different materials could surround the upper surface 112 and/or lower surface 114 of the display 110 as long as any of the surrounding material(s) have an index of refraction lower than that of the display 110. As can be seen by the path 150, in the absence of a user's touch, the electromagnetic signal from the emitter 120 travels to and is, therefore, detected by the detector 130.

As discussed above, the path 150 traveled by the electromagnetic signal includes at least one total internal reflection, such as the total internal reflections 152, 154, and 156. The barriers 140 and 142 prevent the zeroth mode (unreflected) path for the electromagnetic signals from traveling between the emitter 120 and detector 130. Consequently, the electromagnetic signal following the path 150 to the detector 130 from the emitter 120 is the portion of the electromagnetic signal that is both output by the emitter 120 and not blocked by either the barrier 140 or 142. Stated differently, the barriers 140 and 142 ensure that only the electromagnetic signal undergoing at least one total internal reflection might reach the detector 130.

FIG. 3B depicts the embodiment of the touch interface 100 in accordance with the present invention when a user is touching the display 110. Thus, the situation depicted in FIG. 3B results in a touch being detected by the touch interface 100. Referring to FIGS. 2 and 3B, because the user is touching the upper surface 112 of the display 110 at region 116, a portion of the electromagnetic signal is transmitted and subsequently scattered or absorbed at the region 116. This is exemplified by reflection 154'. Thus, the path 150' is altered such that a portion of the electromagnetic signal does not reach the detector 130. Instead, the portion of the electromagnetic signal reflecting at the region 116 is transmitted, subsequently scattered or absorbed, and may exit the display 110 in a different region, for example at the lower surface 114.

Thus, the portion of the electromagnetic signal that undergoes total internal reflection 154' at the region 116 will no longer reach the detector 130. Consequently, the electromagnetic signal at the detector 130 decreases to levels low enough that the user's touch is detected. Thus, the user's touch is detected.

In one embodiment, the detector 130 is configured such that when the remaining portion of the electromagnetic signal (if any) reaching the detector 130 along the path 150' is at or below a particular threshold, the detector 130 indicates that no electromagnetic signal has been received. In such an embodiment, an output signal from the detector 130 indicating that no electromagnetic signal has been detected corresponds to a user's touch. In an alternate embodiment, the detector 130 may simply provide an output signal proportional to the amount of electromagnetic signal detected. In such an embodiment, the detector 130 may be coupled to component(s) (not shown) that compare the output signal of the detector 130 to another threshold. If the output signal is at or below this threshold, it is indicated that the user has touched the display. Furthermore, because multiple emitters 120 and detectors 130 are used, a touch at any portion of interest of the display 110 can be detected by the touch interface 100.

Thus, the touch interface 100 detects the user's touch when the path 150' is altered such that at least the portion of the electromagnetic signal does not reach the detector. Further, an inadvertent touch, such as by a piece of clothing or a fly, may not result in detection of a false positive by the touch interface 100. For such an inadvertent touch, the reduction in the electromagnetic signal reaching the detector 130 may be small enough that the inadvertent touch is not detected. In particular, the change in the index of refraction outside of the display due to the inadvertent touch may be insufficient or occur over a small enough area that any change in the angle of reflection is small. Consequently, a large portion of the electromagnetic signal still reaches the detector 130. This large portion of the electromagnetic signal is sufficient that no false positive occurs. Thus, the touch interface 100 not only functions, but may also result in fewer false positive detections due to inadvertent touches.

Figure 4:
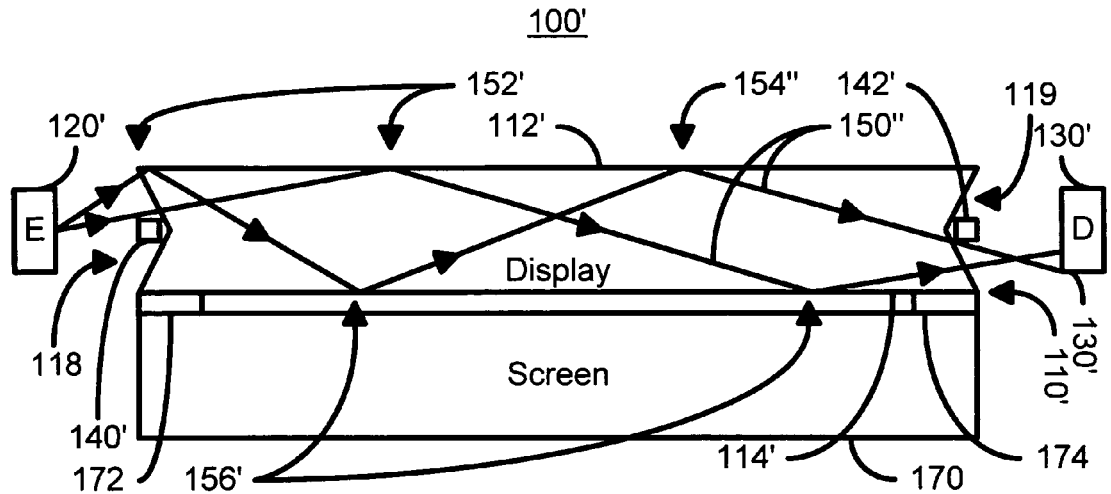
FIG. 4 is a diagram depicting a side view of a portion of another embodiment of a touch interface in accordance with the present invention when a user is not touching the display.

FIG. 4 is a diagram depicting a side view of a portion of another embodiment of a touch interface 100' in accordance with the present invention when a user is not touching the display. The touch interface 100' is analogous to the touch interface 100. Consequently, similar components are labeled in an analogous fashion. Thus, the touch interface 100' includes a display 110' having a top surface 112' and a bottom surface 114', emitter 120', detector 130', barriers 140' and 142', as well as an electromagnetic signal having a path 150" and total internal reflections 152', 154", and 156'. Note however, that the display 110' has been placed over a conventional screen 170 and is separated from the screen 170 by spacers 172 and 174. In a preferred embodiment, the spacers 172 and 174 are merely double-stick tape. Thus, the spacers 172 and 174 preferably serve the dual purpose of separating the display 110' from the screen 170 and affixing the display 110' in place. The touch interface 100' may, therefore, be formed simply by adding the display 110', spacers 172 and 174, and barriers 140' and 142' to a conventional system already having emitters 120' and detectors 130'. The spacers 172 and 174 ensure that a gap exists between the display 110' and the screen 170. Thus, the spacers 172 and 174 ensure that the index of refraction of the material adjacent to the bottom surface 114' of the display 110' is less than the index of refraction of the display 110'.

In addition, the display 110' includes beveled edges 118 and 119. The beveled edges 118 and 119 are shaped to refract the signal passing through the display 110 such that a greater portion of the electromagnetic signal travels through the desired paths 150'. Note that although a particular shape of the beveled edges 118 and 119 is depicted in FIG. 4, nothing prevents the use of another shape that can focus the power in the electromagnetic signal to the desired paths. Furthermore, nothing prevents the use of the beveled edges 118 and 119 from being used in another embodiment, such as the touch interface 100.

The touch interface 100' functions in analogous manner to the touch interface 100 and has many of the same advantages including less likely detection of inadvertent touches. Furthermore, the touch interface 100' may be relatively simply and inexpensive to implement. The touch interface 100' may also be added to conventional systems, allowing conventional touch interfaces to be upgraded without incurring significant costs.

Figure 5:
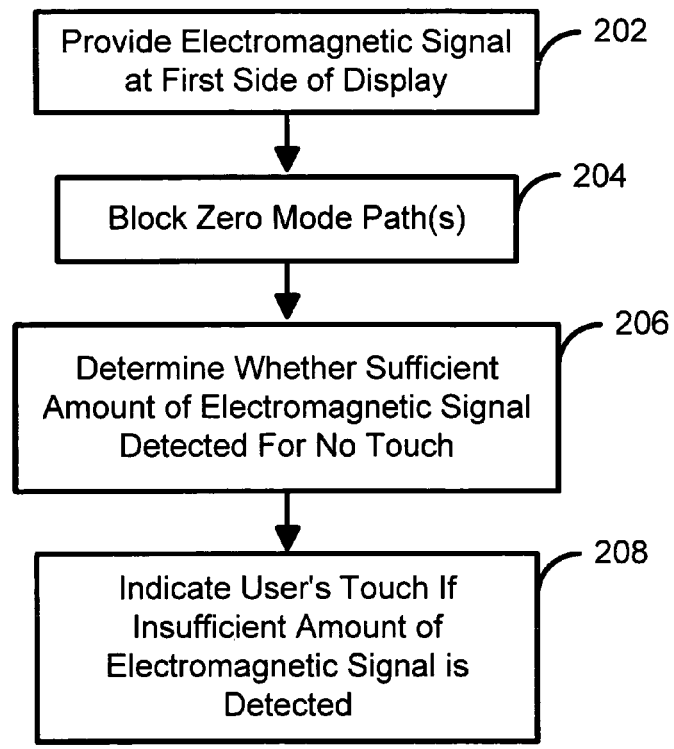
FIG. 5 is a diagram depicting one embodiment of a method in accordance with the present invention for providing a touch interface.

FIG. 5 is a diagram depicting one embodiment of a method 200 in accordance with the present invention for providing a touch interface. For clarity, the method 200 is described in the context of the touch interface 100. However, nothing prevents the method 200 from being used in conjunction with a system not inconsistent with the present invention. An electromagnetic signal is provided from a first side of the display of the touch interface, via step 202. In a preferred embodiment, step 202 is performed using the emitters 120. The zero mode path between the emitter and the detector for the electromagnetic signal is blocked, via step 204. In a preferred embodiment, step 204 is performed using the barriers 140 and 142. It is determined whether a sufficient remaining portion of the electromagnetic signal is detected at the second side of the display 110 to determine that a user has not touched the screen, via step 206. In a preferred embodiment, step 206 is performed using the detectors 130. In addition, step 206 is performed such that in the absence of a user's touch, any portion of the electromagnetic signal detected must traverse a path through the display and between the first and second sides and include at least one total internal reflection in the display 110. Thus, in the absence of the user's touch, step 206 detects a sufficient amount of the electromagnetic signal traversing the path that the user's touch is not detected. Step 206 is also performed such that the user's touch at one of the at least one total internal reflection alters the path such that a portion of the electromagnetic signal is not detected on the second side. The portion that is not detected is sufficient large that the user's touch is detected in step 206 when the path is so altered. Stated differently, the amount of the electromagnetic signal that is detected in the presence of the user's touch is sufficiently small that the user's touch would be detected in step 206. The user's touch, if any, is indicated in response to step 206 indicating that the portion of the electromagnetic signal is not detected, via step 208.

Thus, using the method 200, the touch interfaces 100 and 100' can detect the user's touch when the path 150' is altered such that at least the portion of the electromagnetic signal does not reach the detector. Further, as discussed above, an inadvertent touch, such as by a piece of clothing or a fly, may not result in detection of a false positive by the touch interface 100. Thus, the method 200 not only functions, but may also result in fewer false positive detections due to inadvertent touches.

A method and system for providing a touch interface has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for providing a touch interface for including a display, the method comprising:

providing an electromagnetic signal to the display from a first side of the display to a second side of the display, wherein the display is transparent and the first and second sides are beveled within the display;

determining whether the electromagnetic signal is detected at the second side of the display, the display providing the electromagnetic signal a path between the first side and the second side through the display in the absence of a detectable touch such that the electromagnetic signal is detected at the second side of the display in the absence of the detectable touch, the path including at least one total internal reflection in the display, and where the detectable touch when at one of the at least one total internal reflection is detectable as a portion of the electromagnetic signal transmitted along the path is not detected on the second side; and blocking a zero mode path between the emitter and the detector for the electromagnetic signal, wherein the zero mode path is characterized by a path without internal reflection.

2. The method of claim 1 wherein the display includes a third side having an interface between the display and air.

3. The method of claim 1 further comprising:
providing an indication of the detectable touch in response to the a portion of the electromagnetic signal transmitted along the path not being detected by a corresponding detector.

4. The method of claim 1 wherein the second side is opposite to the first side.

5. The method of claim 1 further comprising:
providing a first plurality of electromagnetic signals to the display from a third side of the display;
determining whether each of the first plurality of electromagnetic signals is detected at a fourth side of the display, the first plurality of electromagnetic signals being detected in the absence of a detectable touch, each of the first plurality of electromagnetic signals having a first path through the display in the absence of the detectable touch, the first path including at least one additional total internal reflection in the display, the detectable touch at one of the at least one additional total internal reflection altering the first path such that the first corresponding electromagnetic signal is not detected; and blocking a first zero mode path for each of the first plurality of electromagnetic signals.

6. A method for providing a touch-sensitive interface providing reduced false positive touch detections, having a transparent display with a predetermined index of refraction in relation to an index of refraction of a surrounding area of the display, wherein the index of refraction of the display is at least slightly greater than the index of refraction of the surrounding area, comprising:
transmitting an electromagnetic signal from a first side of the display, into the display, and generally towards a second side of the display through the display, wherein the transmitted electromagnetic signal forms a pathway, and the first and second sides are beveled within the display;
detecting whether the transmitted electromagnetic signal is detected at the second side of the display;
indicating one of either a detectable touch occurring or not occurring, the detectable touch is indicated as having occurred when a predetermined portion of the transmitted electromagnetic signal is not detected at the second side of the display since the pathway fails to yield sufficient internal reflection of a predetermined touch sensitivity, and the detectable touch is indicated as not having occurred when a predetermined portion of the transmitted electromagnetic signal is detected at the second side of the display since the pathway yields a sufficient internal reflection of a predetermined touch sensitivity; and
blocking a zero mode path between the emitter and the detector for the electromagnetic signal, wherein the zero mode path is characterized by a path without internal reflection.

7. The method of claim 1, wherein the bevels of the first and second sides of the display are embedded along a length of the first side and a length of the second side.

8. The method of claim 1, wherein the first and second sides include a barrier positioned at the bevels to block the zero mode path.

9. A touch interface, comprising:
at least one emitter to provide an electromagnetic signal to a display from a first side of the display to a second side of the display, wherein the display is transparent and the first and second sides are beveled within the display;
at least one detector, corresponding to each of the at least one emitter, the at least one detector configured to determine whether the electromagnetic signal is detected at the second side of the display, the display providing the electromagnetic signal a path between the first side and the second side through the display in the absence of a detectable touch such that the electromagnetic signal is detected at the second side of the display in the absence of the detectable touch, the path including at least one total internal reflection in the display, and where the detectable touch when at one of the at least one total internal reflection is detectable as a portion of the electromagnetic signal transmitted along the path is not detected on the second side; and
a barrier within bevels of the first and second sides, the barriers configured to block a zero mode path between the emitter and the detector for the electromagnetic signal, wherein the zero mode path is characterized by a path without internal reflection.

10. The touch interface of claim 9 wherein the display includes a third side having an interface between the display and air.

11. The touch interface of claim 9, wherein the detector indicates the detectable touch in response to the a portion of the electromagnetic signal transmitted along the path not being detected by a corresponding detector.

12. The touch interface of claim 9, wherein the second side is opposite to the first side.

13. A system for providing a touch interface for a display comprising:
an emitter on a first side of the display, the emitter providing an electromagnetic signal to the display; and
a detector on a second side of the display, the electromagnetic signal having a path from the emitter to the detector through the display in the absence of a user's touch such that the electromagnetic signal is detected by the detector in the absence of the user's touch, the path including at least one total internal reflection in the display; and
a barrier for blocking a zero mode path between the emitter and the detector for the electromagnetic signal, the zero mode path comprising a path without internal reflection;
wherein the emitter and the detector are configured such that the user's touch at any of the at least one total internal reflection alters the path such that a portion of the electromagnetic signal does not reach the detector.

14. The system of claim 13 wherein the barrier for blocking the zero mode path further comprises an emitter bather corresponding to the emitter, the emitter barrier residing between the emitter and the display.

15. The system of claim 13 wherein the barrier for blocking the zero mode path further comprises a detector barrier corresponding to the detector, the detector barrier residing between the detector and the display.

16. The system of claim 13 wherein the display includes a third side having an interface between the display and air.

17. The system of claim 13 wherein the second side is opposite to the first side.

18. The system of claim 13 wherein the detector indicating that the portion of the electromagnetic signal failed to reach the detector corresponds to the user's touch.

19. The system of claim 13 wherein at least one of the first side and the second side of the display includes at least one beveled edge.

20. A system for providing a touch interface for a display comprising:
   a plurality of emitters on a first side of the display, each of the plurality of emitters providing an electromagnetic signal to the display;
   a plurality of detectors on a second side of the display, the electromagnetic signal having a path from each of the plurality of emitters to a corresponding detector of the plurality of detectors through the display in the absence of a user's touch such that the electromagnetic signal is detected by the corresponding detector in the absence of the user's touch, the path including at least one total internal reflection in the display;
   a plurality of barriers corresponding to the plurality of emitters, the plurality of barriers residing between the plurality of emitters and the display, each of the plurality of barriers for blocking a zero mode path between the emitter and the corresponding detector for the electromagnetic signal; and
   a plurality of detector barriers corresponding to the plurality of detectors, the plurality of detector barriers residing between the plurality of detectors and the display, each of the plurality of detector barriers for blocking the zero mode path between the emitter and the corresponding detector for the electromagnetic signal wherein the plurality of emitters and the plurality of detectors are configured such that the user's touch at any of the at least one total internal reflection alters the path such that a portion of the electromagnetic signal does not reach the corresponding detector.

21. The system of claim 20 further comprising:
   a first plurality of emitters on a third side of the display, each of the first plurality of emitters providing a first electromagnetic signal to the display;
   a first plurality of detectors on a fourth side of the display, the fourth side opposing the third side, the first electromagnetic signal having a first path from each of the first plurality of emitters to a corresponding first detector of the first plurality of detectors through the display in the absence of the user's touch such that the first electromagnetic signal is detected in the absence of the user's touch, the path including at least one additional total internal reflection in the display;
   a first plurality of barriers corresponding to the first plurality of emitters, the first plurality of barriers residing between the first plurality of emitters and the display, the first plurality of barriers for blocking a first zero mode path between the first plurality of emitters and the first plurality of detectors for the first electromagnetic signal;
   a first plurality of detector barriers corresponding to the first plurality of detectors, the first plurality of detector barriers residing between the first plurality of detectors and the display, each of the first plurality of detector barriers for blocking the zero mode path between the first emitter and the first corresponding detector for the electromagnetic signal;
   wherein the first plurality of emitters and the first plurality of detectors are configured such that the user's touch at one of the at least one additional total internal reflection alters the first path such that the first electromagnetic signal does not reach the corresponding first detector.

* * * * *